United States Patent [19]

Kumagai et al.

[11] Patent Number: 4,598,929
[45] Date of Patent: * Jul. 8, 1986

[54] VEHICLE SUSPENSION SYSTEM

[75] Inventors: Naotake Kumagai, Aichi; Minoru Tatemoto, Okazaki; Shozo Takizawa, Okazaki; Hiroyuki Takada, Okazaki; Mitsuhiko Harara, Okazaki, all of Japan

[73] Assignee: Mitsubishi Jidosha Kogyo K.K., Tokyo, Japan

[*] Notice: The portion of the term of this patent subsequent to Aug. 13, 2002 has been disclaimed.

[21] Appl. No.: 576,204

[22] Filed: Feb. 2, 1984

[30] Foreign Application Priority Data

Feb. 3, 1983 [JP] Japan .................................. 58-16655
Feb. 3, 1983 [JP] Japan .................................. 58-16656

[51] Int. Cl.$^4$ ............................................. B60G 11/26
[52] U.S. Cl. .................................. 280/707; 188/299; 267/64.21
[58] Field of Search ............... 280/668, 707, 710, 712, 280/714; 188/285, 299, 319; 267/34, 64.21, 64.24, 64.25, 64.27

[56] References Cited

U.S. PATENT DOCUMENTS 3,954,257  5/1976  Keijzer et al. .................. 267/64.21
4,313,529  2/1982  Kato et al. ......................... 280/714
4,463,839  8/1984  Ashiba .............................. 188/299
4,468,739  8/1984  Woods et al. ...................... 280/707

FOREIGN PATENT DOCUMENTS 26021  3/1978  Japan .

Primary Examiner—John J. Love
Assistant Examiner—Ross Weaver
Attorney, Agent, or Firm—Robert E. Burns; Emmanuel J. Lobato; Bruce L. Adams

[57] ABSTRACT

When an automobile or other vehicle travels over a bump with a suspension in its switchable suspension system kept in a "soft" state, the car body pitches violently. This pitching is reduced by turning the suspension into a "hard" state by increasing the damping capacity of its shock absorber and the spring constant of its air-spring chambers in accordance with a signal supplied from a car-height sensor detecting the compressed or stretched condition of the suspension. The change of the spring constant is executed with the following construction: an auxiliary air-spring chamber resting above a main air-spring chamber surrounding a piston rod, and an air passage within the piston rod for intercommunicating the main and auxiliary air-spring chambers are provided in the system, and the connection and disconnection between the two chambers through the air passage are controlled by the piston rod and a control rod extending in the piston rod.

19 Claims, 4 Drawing Figures

FIG. I(a)
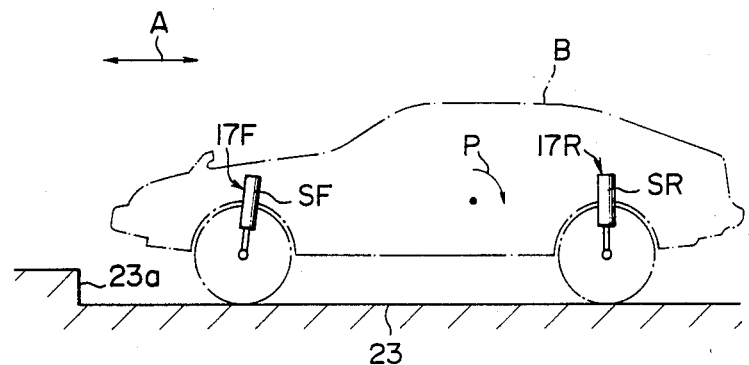
FIG. I(b)
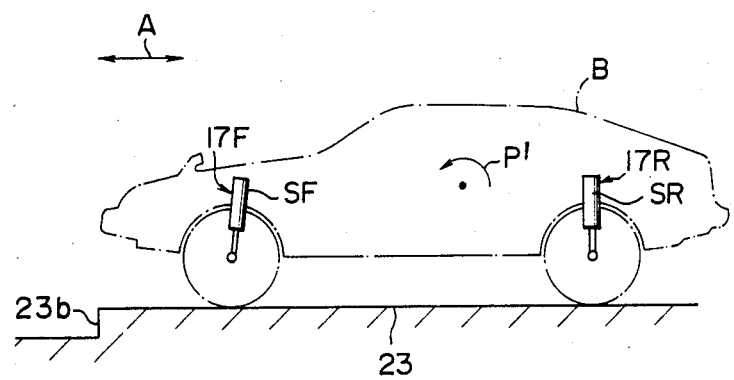

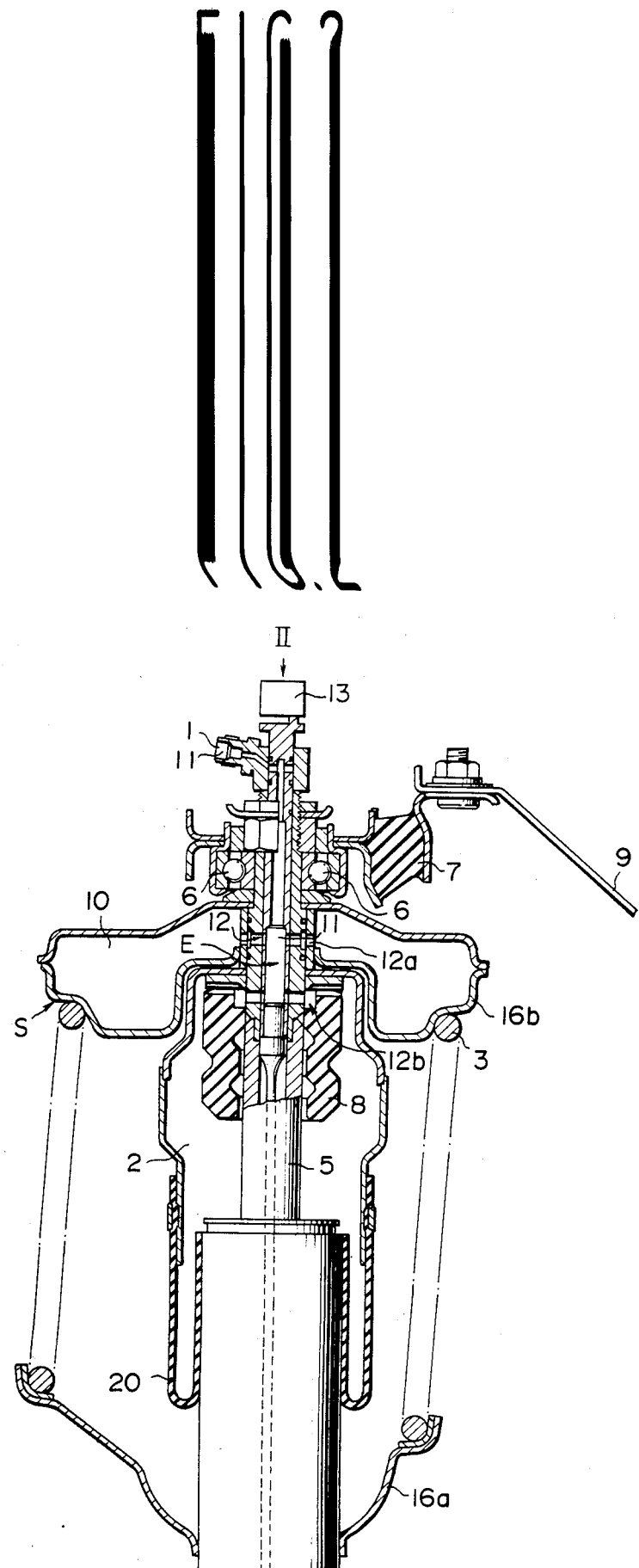

VEHICLE SUSPENSION SYSTEM

BACKGROUND OF THE INVENTION

1. Field of the Invention

This invention relates to a suspension system for use with automobiles and other vehicles.

2. Description of the Prior Art

Various types of suspension systems incorporating shock absorbers have been developed to absorb the shocks vehicles encounter on the road.

The drawback with these conventional suspension systems is to sacrifice either riding comfort or steering stability.

To provide a comfortable ride, suspensions must be elastic (or "soft"). But soft suspensions inevitably lower handling stability.

If a vehicle with a soft suspension runs over an upward step (including a bulge) or a downward step (including a depression) on the road, the car body may pitch or bounce uncomfortably, and further the riding comfort is lowered and some parts of the vehicle might be damaged with the suspension either over-compressed or over-stretched.

Among the prior art, a Japanese Patent Application whose early publication number is 53-26021, discloses a suspension system wherein the spring constant of a suspension is adapted to be increased when the stroke amount (= the moving distance of a wheel with respect to a car body) exceeds a preset value. This suspension system can prevent the car-height from lowering through hard buffering action in the case of the spring constant increased. On the other hand, however, this suspension system aggravates the upward displacement of the car-height. And further it has such a drawback that the car body continues to bounce uncomfortably for a rather long time after the car passed a step (e.g., a depression or bulge) on the road.

SUMMARY OF THE INVENTION

The object of this invention is to eliminate the aforementioned shortcomings by providing a new type of suspension system for vehicles that provides a high degree of riding comfort and steering stability by varying the damping capacity of the shock absorber and the spring constant of the air-spring chamber depending upon the road conditions while keeping the car height at a level high enough to leave a desired road clearance, reduces the pitching and bouncing caused by uneven road surface, and prevents the over-compression or over-stretching of the suspension.

And another object of this invention is to provide a suspension system which is equipped with a main air-spring chamber and an auxiliary air-spring chamber and a switch valve connecting and disconnecting the two air-spring chambers thereby permitting the change of air volumes in the air-spring chambers which in turn results in a change in the spring constant of the suspension, with the auxiliary air-spring chamber and the switch valve provided quite compactly in the system.

And further, another object of this invention is to provide a suspension system having said two air-spring chambers wherein only one actuator can actuate at the same time both a spring-constant switching mechanism and a damping capacity switching mechanism in a shock absorber.

And moreover, another object of this invention is to provide a suspension system with said two air-spring chambers wherein the bottom of the auxiliary air-spring chamber serves as also a spring bearing supporting the top end of a coil spring placed in parallel with an air-spring which helps constructing the entirety of the suspension system in a very compact form with the number of parts reduced.

In order to achieve the above objects, the suspension system for vehicles according to this invention has a shock absorber equipped with a damping capacity switching mechanism and an air-spring chamber equipped with a spring constant switching mechanism, plus a car-height sensor to detect the compressed and stretched conditions of a suspension, and control means feeding a control signal to said damping-capacity switching mechanism and spring-constant switching mechanism in order to change the damping capacity of the shock absorber and the spring constant of the air-spring chamber in accordance with a signal supplied from said car-height sensor, said control means being adapted to supply said control signal for increasing both the damping capacity of the shock absorber and the spring constant of the air-spring chamber to said damping-capacity switching mechanism and said spring-constant switching mechanism when the car height detected by said car-height sensor differs from a standard car-height by such a value as to exceed a preset one.

Accordingly, the suspension system for vehicles according to this invention provides the following desirable effects or advantages:

(1) Riding comfort and safety can be increased by keeping the car's wheels in firm constant contact with the road and enhancing steering stablility depending upon the acceleration and other factors working on the car body while keeping the car height at a given level through the variation of the damping capacity of the shock absorber and the spring constant of the air-spring chamber.

(2) The bouncing frequency fn of the car body is decreased (with a resulting increase in riding comfort) by lowering the damping capacity and spring constant and distributing the damping capacity and spring constant appropriately between the front and rear wheels. In addition, such a pitching frequency fn' and a bouncing frequency fn that provide the most comfortable ride can be choosen as desired.

(3) Detecting the force working on the car body in the pitching direction, the car-height sensor initiates a signal to put the suspension into a "hard" state, thereby reducing the tilting or pitching of the car body and preventing the over-compression or over-stretching of the suspension.

(4) Provision can be made to detect the car height when it sinks with a gradient steeper than the preset one. Based upon the result of detection, the suspension can be turned "hard" before the car height becomes too low to insure safety.

(5) Provision can be made to detect the car height when it rises with a gradient steeper than the preset one. Based upon the result of detection, the suspension can be turned "hard" before the car height becomes too high to insure safety.

(6) The spring constant can be changed easily by changing the air volumes of the air-spring chambers consisting of the main and auxiliary air-spring chambers depending on the connecting and disconnecting action of the switch valve between said two air-spring chambers.

Rotating the drive pin 15 opens and closes the switch valve 12 and thereby regulates the air volumes in the two air-spring chambers. The switch valve 12, passage 11, and so on comprise a spring-constant switching mechanism E (FIG. 3).

The change in the air volumes in the two air-spring chambers results in a change in the spring constant of the suspension.

In FIGS. 1(a) and (b) and 2, reference character 8 designates a bump stopper which protects the walls of the main air-spring chamber 2 from a damage that might result from the relative ascent of the cylinder 1a of the shock absorber 4 on rough roads, 3 a coil spring, 16a and 16b spring bearings to support the coil spring 3, 20 a bellows forming a part of the main air-spring chamber 2, A the longitudinal direction of the car body, and P and P' the directions in which the car body B tilts as a result of pitching.

Compressed air for car-height control is generated in a compressor and supplied to each suspension unit S through a drier, joint, rear and front solenoid valves, connecting piping 1, and the communicating passage 11 through the partly tubular drive pin.

The suspension unit S is attached to each wheel of the car body B. FIGS. 1(a) and (b) show only suspension units SF and SR on the left-hand front and rear wheels, and the identical units on the right-hand side are not shown.

The compressor compresses atmospheric air supplied from an air cleaner and feeds the compressed air to the drier. The compressed air dried by silica gel or other dehydrating agent in the drier is then supplied to each suspension unit S.

The drier is connected to a reserve tank from which part of the compressed air is supplied through an intake solenoid valve to each suspension unit S.

At the right-hand front of the automobile, a front car-height sensor 17F to detect the height of the car front is attached to a lower arm. The front car-height sensor 17F comprises a higher car-height sensor 17H that detects a state in which the suspension is fully stretched and a lower car-height sensor 17L that detects a state in which the suspension is compressed, with the upper end of the shock absorber 4, for example, contacting the bump stopper 8.

The car-height sensors 17H and 17L feed a signal representing the detected front car-height to a control unit (microcomputer) 14 (see FIG. 3) as a control means.

At the left-hand rear of the automobile, a rear car-height sensor 17R to detect the height of the car rear is attached to a lateral rod. The rear car-height sensor 17R has a structure similar to that of the front car-height sensor 17F and feeds a signal representing the detected rear car-height to the control unit 14.

The higher and lower car-height sensors 17H and 17L detect higher and lower car-heights by means of a hall effect IC device and a magnet that are attached to the wheel and car body, respectively, or vice versa.

The speedometer contains a car-speed sensor 18 that detects the car-speed and feeds a corresponding signal to the control unit 14. The car-speed sensor 18 is of the lead-switch type when used with a mechanical speedometer and of the transistor open-collector output tupe when used with an electronic speedometer.

The accelerator pedal is equipped with an accelerator opening sensor 21 that feeds a signal indicating the opening of the accelerator to the control unit 14.

There is also provided a lateral acceleration sensor 22 that detects the acceleration, and its change, in the direction in which the car body rolls. Detecting a rolling-induced change in the position of the car body on springs, the lateral acceleration sensor 22 feeds a corresponding signal to the control unit 14.

Based on the signals supplied from the individual sensors, the control unit 14 feeds a control signal through a solenoid actuation circuit 13a to a damping-capacity switching mechanism D and a spring-constant switching mechanism E of the suspension unit S, thereby hardening or softening the suspension unit S.

When the engine is started, the car-height is set to a normal level by supplying compressed air from the compressor through the piping 1 to the air-spring chambers 2 and 10 so that the suspension system is held in a normal state.

With the switch valve 12a kept open, the pressure inside the auxiliary air-spring chamber 10 is maintained at the same level as that in the main air-spring chamber 2.

The spring-constant and damping-capacity switching functions of the suspension system according to this invention are as follows.

The spring constant and damping capacity of the front and rear wheels can be switched simultaneously from the "soft" state to the "hard" state and vice versa. This switching is effected by the automatic actuation of the solenoid 13 by the control unit 14.

To be more specific, the suspension unit S, which is normally kept in a "soft" state, gets hardened when any one of the signals from the sensors 17F, 17R, 18, 21 and 22 satisfies the hardening conditions described later and actuates the hardening solenoid.

First, the manner in which the lower car-height sensor 17L detects the relative lowering of the car-height that occurs when the car encounters a bulge or upward step on the road will be described. As the suspension unit SF moves from a flat portion 23 of the road to over a bulge or upward step 23a, the lower car-height sensor 17L detects a lowered car-height and outputs a corresponding signal.

This signal indicating the lowered car-height is fed to the control unit 14 that turns the damping-capacity switching mechanism D of the shock absorber 4 and the spring-constant switching mechanism E of the air-spring chambers 2 and 10 into a "hard" state through the solenoid actuation circuit 13a.

Thus, when the suspension unit SF on each front wheel receives a sudden up-thrust from the bulge or upward step 23a, the lower car-height sensor 17L thereon detects the resulting lowering of the car-height and outputs a corresponding signal that turns the front-wheel suspension unit SF into a "hard" state.

The front-wheel suspension unit SF thus hardened eases the tilting of the car body B due to pitching (see reference character P in FIG. 1(a)), without getting over-compressed.

When the lower car-height sensor 17L on the rear-wheel suspension unit SR detects the relative lowering of the car-height following the detection made by the lower car-height sensor 17L on the front-wheel suspension unit SF, the suspension is hardened in substantially the same manner as with the front-wheel suspension unit SF just described.

Provision may be made to turn the suspension units SF and SR on all of the four wheels into a "hard" state when any one of the lower car-height sensors 17L thereon detects the lowering of the car-height.

Next, the manner in which the higher car-height sensor 17H detects the relative rising of the car-height that occurs when the car encounters a depression or downward step on the road will be described. As the suspension unit SF moves from a flat portion 23 of the road to over a depression or downward step 23b, the higher car-height sensor 17H detects a raised car-height and outputs a corresponding signal.

This signal indicating the raised car-height is fed to the control unit 14 that turns the damping-capacity switching mechanism D of the shock absorber 4 and the spring-constant switching mechanism E of the air-spring chambers 2 and 10 into a "hard" state through the solenoid actuation circuit 13a.

Thus, when the suspension unit SF on each front wheel receives a sudden down-thrust from the depression or downward step 23b, the higher car-height sensor 17H thereon detects the resulting rising of the car-height and outputs a corresponding signal that turns the front-wheel suspension unit SF into a "hard" state.

The front-wheel suspension unit SF thus hardened eases the tilting of the car body B due to pitching (see reference character P' in FIG. 1(b)), without getting over-stretched.

When the higher car-height sensor 17H on the rear-wheel suspension unit SR detects the relative rising of the car-height following the detection made by the higher car-height sensor 17H on the front-wheel suspension unit SF, the suspension is hardened in substantially the same manner as with the front-wheel suspension unit SF just described.

Provision may be made to turn the suspension units SF and SR on all of the four wheels into a "hard" state when any one of the higher car-height sensors 17H thereon detects the rising of the car-height.

The higher and lower car-height sensors 17H and 17L are appropriately combined so that the suspensions are hardened when they detect the rising or lowering of the car-height.

Provision may be made so that the control unit 14 gives a suspension hardening instruction based on a combination of the car-height signals from the car-height sensors 17F and 17R and the car-speed signals from the car-speed sensor 18, rather than on the former alone.

Also, a differentiator may be positioned between the car-height sensors 17F and 17R and the control unit 14 so that the car-height can be detected when the gradient of its change exceeds a given limit. This permits predicting the car-height before it becomes too high or too low, thereby allowing the suspensions to be hardened beforehand and assuring higher safety.

When the differentiator is provided, provision may also be made to feed a "hardening" signal to the switching mechanisms D and E of the suspension unit S if the car-height lowers below a given level and/or with a gradient steeper than the preset one.

Provision may also be made to feed a "hardening" signal to the switching mechanisms D and E of the suspension unit S if the car-height rises above a given level and/or with a gradient steeper than the preset one.

Switching from a "hard" state to a "soft" state is accomplished by the softening solenoid that is actuated a few seconds after all of the hardening conditions have been released. This time-lag of a few seconds is conducive to the prevention of chattering that might occur when switching is effected.

The spring-constant and damping-capacity switching ratios between the "soft" and "hard" states are set at appropriate values.

The spring constant and damping capacity are distributed differently between the front and rear wheels. That is, the spring constant and damping capacity of the individual suspension units S are set so that the rear suspension becomes harder than the front suspension in the "soft" state, and vice versa.

By thus changing the hardness of the suspension units S on the front and rear wheels, the center of elasticity and the understeer/oversteer characteristics (US/OS characteristics) can be controlled appropriately.

Only one of the right-hand and left-hand suspension units S, such as the one on which greater component of vertical force works, may be hardened.

Adequate steering stability is secured even in the "soft" state. Besides, the switching function is designed to stop, even in the case of failure, only after the suspension has been turned to the "hard" state.

The function to switch the spring constant and dumping capacity of the suspension unit S can be actuated independently of a car-height adjusting function described later, whereby one of the two functions can work even when the other fails.

The hardening conditions are set on the basis of the signals fed from the sensors 17F, 17R, 18, 21 and 22.

The lower and higher car-height sensors 17L and 17H set the hardening conditions as described previously.

Setting is made so that the suspension unit S gets hardened when the lateral acceleration sensor 22 detects a lateral acceleration.

Setting is made so that the suspension unit S is maintained in the "soft" state when the car speed remains below a given limit.

Also setting is made so that the suspension unit S gets hardened when the opening or closing rate (m/sec) of the accelerator, as detected by the accelerator opening sensor 21, and the car speed both exceed given limits.

The suspension system according to this invention is also capable of adjusting (or maintaining) the car-height by regulating the pressure of the compressed air supplied from the compressor to the main air-spring chamber 2. The front and rear car-height sensors 17F and 17R detect the car height and feed a corresponding signal to the control unit 14 which, in turn, supplies a control signal to the compressor for car-height regulation.

When the car height is lower than a preset level, that is, when the car body sinks under the increased weight of passengers or other load for several seconds or when the control unit 14 judges, based on the signals from the car-height sensors 17H and 17R, that the car height is lower than the preset level, the reserve tank begins to supply air to the main air-spring chamber 2 shown in FIG. 2, and also the the auxiliary air-spring chamber 10 if the suspension is in the "soft" state.

When the car body lifts to the preset level, the control unit 14 initiates a control signal based on the signals received from the car-height sensors 17F and 17R, thereby stopping the air supply.

As described above, the damping capacity and spring constant can be appropriately and automatically switched depending upon the running conditions of the car (i.e., depending upon whether the car is running under normal conditions, or with the brakes jammed suddenly, or travelling in a sharp curve or over a rough road). This assures a high degree of riding comfort and steering stability under different running conditions.

Placing the auxiliary air-spring chamber 10 and main air-spring chamber 2, one over the other, on top of the shock absorber 4 helps constructing the entirety of the suspension unit S in a very compact form. With the upper end of the coil spring 3 supported by the spring bearing 16b provided at the bottom of the auxiliary air-spring chamber 10, it is possible to make the unit still more compact through the use of common parts.

Even when used on the front wheels, the suspension system of this invention provides a simple structure because the piping 1 can rotate as the coil spring 3 and the auxiliary air-spring chamber 10 turn with the steering of the front wheels.

Separate actuators may be used as the first and second actuators, in which case the damping capacity and spring-constant can be controlled independently.

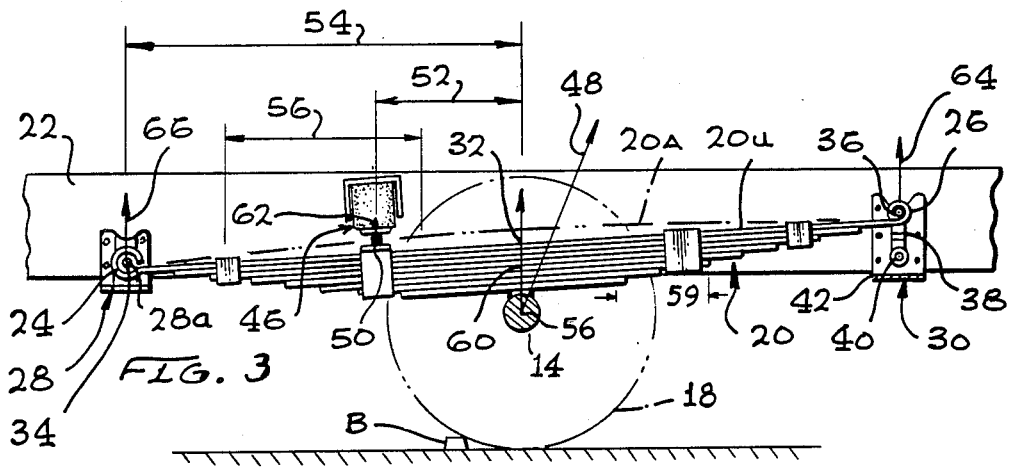

What is claimed is:

1. In a vehicle suspension system having a suspension unit comprised of a shock absorber equipped with a damping-capacity switching mechanism and an air-spring chamber equipped with a spring-constant switching mechanism: car-height sensor means for detecting at least one of the compressed and stretched conditions of a suspension unit and producing a corresponding output signal; control means for feeding a control signal to said damping-capacity switching mechanism and spring-constant switching mechanism in order to change the damping capacity of the shock absorber and the spring constant of the air-spring chamber in accordance with the output signal produced from said car-height sensor means, said control means being operative to supply said control signal for increasing both the damping capacity of the shock absorber and the spring constant of the air-spring chamber to said damping-capacity switching mechanism and said spring-constant switching mechanism when the car height detected by said car-height sensor means differs from a standard car-height by such a value as to exceed a preset value; said shock absorber comprising a cylinder supporting an axle, a piston slidably fitted in said cylinder to divide the space therein into two chambers and being equipped with an orifice passage interconnecting said two chambers, a piston rod connected to said piston and extending upward with its top end supported by a vehicle body; said damping-capacity switching mechanism of the shock absorber comprising a control valve for changing the effective area of said orifice passage of the pistion, and a first actuator for driving said control valve; said air-spring chamber comprising a main air-spring chamber disposed coaxially with the piston rod and the cylinder in such a manner as to surround said piston rod and cylinder for supporting the vehicle weight, and an auxiliary air-spring chamber disposed above said main air-spring chamber coaxially with the piston rod in such a manner as to surround said piston rod; said spring-constant switching mechanism of the air-spring chamber comprising a control rod extending in the interior of said piston rod in the longitudinal direction of the piston rod and being movably mounted so as to vary its position with respect to the piston rod, and a second actuator for changing the position of said control rod; a wall portion of said piston rod surrounding said control rod having openings communicating with said main air-spring chamber and said auxiliary air-spring chamber respectively; and said control rod having an air passage intercommunicating said main air-spring chamber with said auxiliary air-spring chamber through said openings on the wall portion of the piston rod so that the connection and disconnection between said main and auxiliary air-spring chambers are selectively executed by moving said control rod relative to said piston rod.

2. A vehicle suspension system according to claim 1, wherein said second actuator includes means for rotating said control rod so that said control rod changes its position with respect to said piston rod.

3. A vehicle suspension system according to claim 1, wherein said second actuator and said first actuator comprise a single actuator and the bottom end of said control rod is linked with said control valve so that by displacing said control rod with respect to said piston rod by means of said single actuator, the connection and disconnection between said main and auxiliary air-spring chambers are executed selectively and at the same time the effective area of said orifice passge is selectively varied by said control valve.

4. A vehicle suspension system according to claim 1, wherein said car-height sensor means comprises a higher car-height sensor that detects the stretched condition of the suspension unit.

5. A vehicle suspension system according to claim 1, wherein said car-height sensor means comprises a lower car-height sensor that detects the compressed condition of the suspension unit.

6. A vehicle suspension system according to claim 1, wherein said car-height sensor means detects both the stretched and compressed conditions of the suspension unit.

7. A vehicle suspension system according to claim 1; further including a lateral acceleration sensor for detecting the lateral acceleration of the vehicle body, and said control means includes means for turning said suspension in a "hard" state when the detected lateral acceleration is found, based on a signal supplied from said lateral acceleration sensor, to exceed a given limit.

8. A vehicle suspension system according to claim 1; further including a car-speed sensor for detecting the running speed of the vehicle body.

9. A vehicle suspension system according to claim 8, in which said control means includes means for turning said suspension into a "soft" state when the detected car speed is found, based on a signal supplied from said car-speed sensor, to fall below a given limit.

10. A vehicle suspension system according to claim 8, further including an accelerator opening sensor attached to an accelerator pedal that sets the output of an engine on said vehicle body, and said control means includes means for turning said suspension into a "hard" state when the detected opening rate of the accelerator and vehicle speed are found, based on signals supplied from said accelerator-opening and car-speed sensors, to exceed given limits respectively.

11. A vehicle suspension system according to claim 1; further including a compressor for supplying compressed air to said air-spring chamber, and said control means includes means for adjusting the height of said vehicle body to a give level by regulating the supply of compressed air from said compressor to said air-spring chamber when the detected vehicle height is found, based on a signal supplied from said car-height sensor, to differ from a given height.

12. A vehicle suspension system for a motor vehicle comprising: plural suspension units each having a shock absorber and an air spring; the shock absorber comprising a cylinder, a piston slidably disposed in the cylinder and defining on opposite sides of the piston upper and lower cylinder chambers for containing hydraulic fluid, a piston rod connected to the piston and slidably extending through the upper end of the cylinder, means defining an hydraulic passage in the piston interconnecting the upper and lower cylinder chambers, actuatable first valve means for valving the flow of hydraulic fluid through the hydraulic passage between the upper and lower cylinder chambers to thereby vary the damping characteristic of the shock absorber, and first actuating means responsive to a control signal for actuating the first valve means; the air spring comprising means defining a main air-spring chamber disposed coaxially with the cylinder, means defining an auxiliary air-spring chamber disposed coaxially with the main air-spring chamber, means defining an air passage interconnecting the main and auxiliary air-spring chambers, actuatable second valve means for valving the flow of air through the air passage between the main and auxiliary air-spring chambers to thereby vary the air spring constant of the air spring, and second actuating means responsive to a control signal for accordingly actuating the second valve means; sensing means for sensing the extent of extension or retraction, or both, of the piston rod relative to the cylinder and producing a corresponding output signal; and control means responsive to the output signal for developing and applying a control signal to the first and second actuating means when the sensed extent exceeds a predetermined value to accordingly control the varying of both the damping characteristic and the air-spring constant.

13. A vehicle suspension sytem according to claim 12, wherein the first and second actuating means comprise a single, common actuator.

14. A vehicle suspension system according to claim 12, wherein the piston rod has a hollow center portion extending longitudinally therealong and the air passage includes air passageways extending through the sidewall of the piston rod interconnecting the main and auxiliary air-spring chambers with each other through the piston rod hollow center portion, and wherein the second valve means is disposed with the piston rod hollow center portion.

15. A vehicle suspension system according to claim 14 wherin the first and second actuating means comprise a control rod extending longitudinally along the piston rod hollow center portion and being displaceable relative to the piston rod, means connecting the first and second valve means to the control rod for displacement therewith to thereby effect simultaneous actuation of the first and second valve means, and means responsive to the output signal for effecting displacement of the control rod.

16. A vehicle suspension system according to claim 15; including means mounting the control rod for angular displacement, and wherein the means for effecting displacement of the control rod comprises means for effecting angular displacement of the control rod in response to the output signal.

17. A vehicle suspension system according to claim 12 wherein the sensing means comprises a first height sensor for sensing when the vehicle height is higher than a given value, and a second height sensor for sensing when the vehicle height is lower than a given value.

18. A vehicle suspension system according to claim 12; further including lateral acceleration sensing means for sensing the lateral acceleration of the vehicle body and producing a corresponding lateral acceleration output signal; and wherein the control means includes means responsive to the lateral acceleration output signal when the same exceeds a predetermined value for producing a control signal effective to "harden" or increase the damping characteristic and the air-spring constant.

19. A vehicle suspension system according to claim 12; further including speed sensing means for sensing the vehicle speed and producing a corresponding speed output signal; and wherein the control means includes means responsive to the speed output signal when the same falls below a predetermined value for producing a control signal effective to "soften" or decrease the damping characteristic and the air-spring constant.

* * * * *

United States Patent [19]

Smith

[11] Patent Number: 4,598,930
[45] Date of Patent: Jul. 8, 1986

[54] LEAF SPRING VEHICLE SUSPENSION

[76] Inventor: Paul Smith, 16700 Gledhill, Sepulveda, Calif. 91343

[21] Appl. No.: 664,480

[22] Filed: Oct. 24, 1984

Related U.S. Application Data

[63] Continuation-in-part of Ser. No. 494,081, May 12, 1983, Pat. No. 4,494,772.

[51] Int. Cl.⁴ .................. B60G 11/46; B60G 11/56
[52] U.S. Cl. .................................................. 280/712
[58] Field of Search ............ 267/31, 32, 64.19, 64.28, 267/56; 280/692, 697, 662, 172

[56] References Cited

U.S. PATENT DOCUMENTS

| | | | |
|---|---|---|---|
| 3,063,732 | 11/1962 | Harbers et al. | 280/712 |
| 3,269,418 | 8/1966 | Jackson et al. | 280/712 |
| 3,664,681 | 5/1972 | Thaxton | 280/712 |
| 3,730,548 | 5/1973 | Thaxton | 280/712 |

OTHER PUBLICATIONS

Air Lift Company, "Introducing the Revolutionary New Polyair Spring," 1978.

Primary Examiner—Richard A. Bertsch
Attorney, Agent, or Firm—Freilich, Hornbaker, Rosen & Fernandez

[57] ABSTRACT

A vehicle suspension is described for a vehicle whose frame is supported through leaf springs lying on the axles, which avoids reverse bending of the springs while also providing a smoother ride. The system includes an air sleeve having an upper end mounted on the vehicle frame and a lower end bearing against the top of the leaf spring at a location between the axle and the front of the spring. The distance between the axle and the air sleeve is about 38% of the total distance between the axle and the front of the spring where it is connected to the frame, this spacing having been found to provide maximum shock absorption and smoothness of ride.

8 Claims, 4 Drawing Figures